United States Patent [19]

Gast et al.

[11] Patent Number: 4,493,215

[45] Date of Patent: Jan. 15, 1985

[54] VIBRATOR DAMPING FLOW METER

[75] Inventors: Theodor Gast, Berlin; Kurt Binder, Stuttgart; Günter Hönig, Ditzingen, all of Fed. Rep. of Germany

[73] Assignee: Robert Bosch GmbH, Stuttgart, Fed. Rep. of Germany

[21] Appl. No.: 388,890

[22] Filed: Jun. 16, 1982

[30] Foreign Application Priority Data

Jun. 23, 1981 [DE] Fed. Rep. of Germany ....... 3124506

[51] Int. Cl.³ ........................... G01F 1/20; G01F 1/78
[52] U.S. Cl. ................................. 73/861.18; 73/32 A
[58] Field of Search .................... 73/861.18, 861.21, 861.35–861.37, 73/861.74, 32 A, 54, 59

[56] References Cited

U.S. PATENT DOCUMENTS

| | | | |
|---|---|---|---|
| 2,741,918 | 4/1956 | DeBoisblanc | 73/861.18 |
| 3,608,374 | 9/1971 | Miller | 73/32 A X |
| 3,715,920 | 2/1973 | Groberman et al. | 73/861.18 |
| 4,024,759 | 5/1977 | Klinger et al. | |

*Primary Examiner*—Charles A. Ruehl
*Attorney, Agent, or Firm*—Frishauf, Holtz, Goodman & Woodward

[57] ABSTRACT

An electromagnetically excited vibrator with arms carrying baffle members at their ends that are immersed in the flow to be measured is mounted at one or more vibration nodes to reduce loss of vibratory energy to the casing of the flow meter. A flat magnetically conducting cross shape can be mounted at a node in the middle, provided each cross beam of the cross is vibrated in flexure, and the two cross beams vibrate in phase opposition (counter stroke). Such a vibrator is excited by a similarly crossed pair of E-shaped cores with exciter and secondary windings on the middle legs of the cores, or by a coaxial re-entrant core with permanent magnet wafers set in the rim at respective locations separated by an air gap from the arms of the cross. In each case the vibrator can be firmly affixed to the central leg or legs of the core. A two-ended rod system can be excited by magnetostriction, operating differentially on a split middle portion of the core, while the latter is supported at two nodes located between the split middle portion and the respective ends that carry baffle members. Evaluation circuits in all cases measure the vibration damping caused by fluid flow.

15 Claims, 11 Drawing Figures

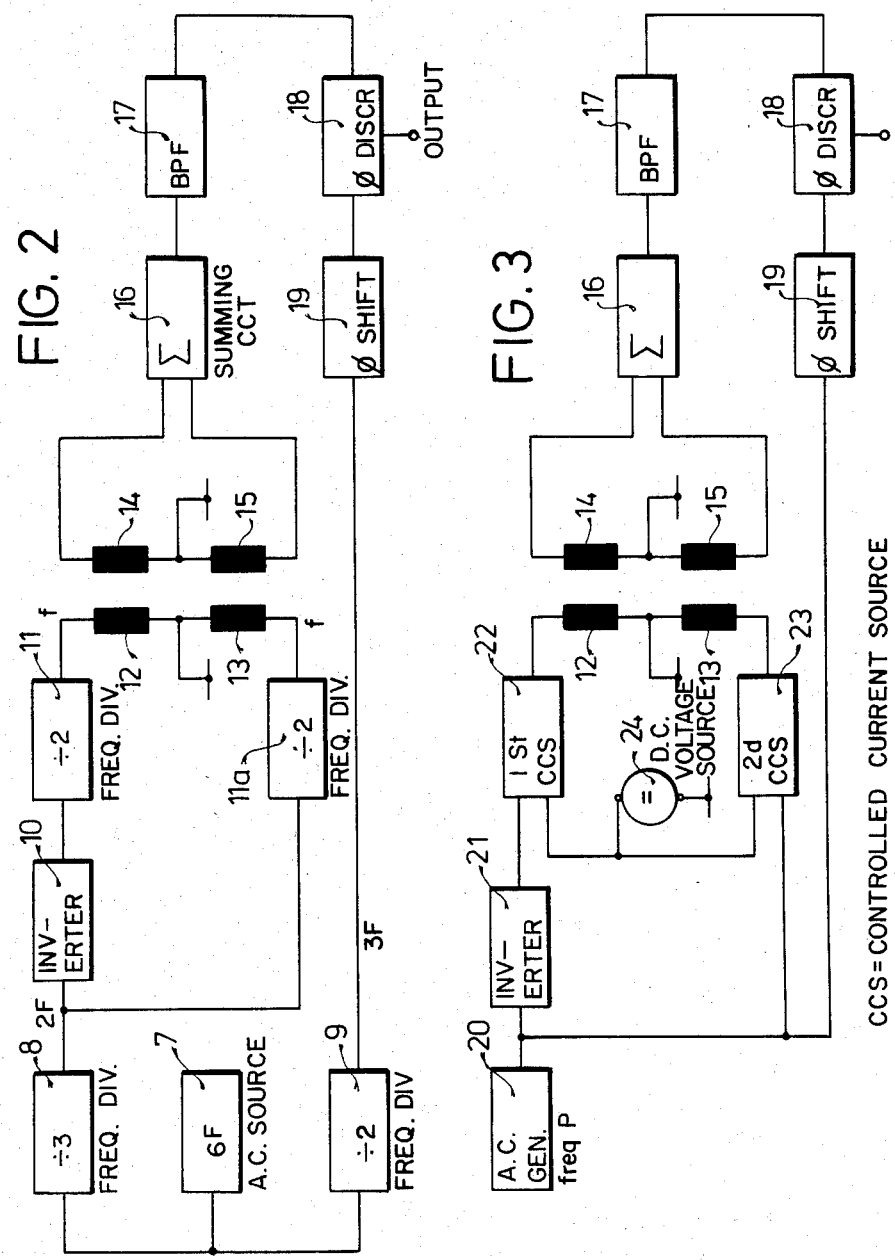

VIBRATOR DAMPING FLOW METER

This invention concerns a mass throughput meter for measuring the flow of a fluid by means of a vibrating device that is damped in a manner that varies with the rate of flow.

Flow rate meters utilizing a vibrating baffle member are described in U.S. Pat. No. 4,024,759. Excitation of the flow meters there described require a large amount of energy, however. For reliable operation of the flow meter an external current source is required from which much energy may be drawn. This requires great energy consumption which is particularly not to be neglected if a multiplicity of flow meters are to be operated. Also, when installed in vehicles, the known devices are disadvantageous because they unduly load the vehicle battery.

The Invention. It is an object of the present invention to provide a flow meter having low energy consumption that is nevertheless reliable and accurate.

Briefly, in a first embodiment, an electromagnetically vibratory body made of magnetically conducting material in cross shape and carrying baffle members at the ends of the cross is excited by a magnet system into vibration of the beams of the cross in flexure, so that both ends of both beams vibrate in unison. This system of vibration porvides a single node in the center where the vibrating body can be mounted.

In another embodiment, a magnetostrictive rod structure with baffle members at its two ends is magnetically excited to vibrate in flexure, in this case being mounted at two nodal points and having a split middle portion composed of two parallel legs each wound with a coil and provided with remanent magnetization in such a way that passing alternating current through the coils will vibrate the rod structure in flexure in a plane passing through the axis of the duct through which the flow medium passes.

The flow meters of the invention have the advantage that only a very small amount of vibration energy, and therefore only a small supply current, is necessary for operation. Furthermore, the measuring head located in the fluid flow can be made relatively sturdy and resistant to shock. The coil windings acting as sources for the measurement signals, moreover, have small internal resistance, so that the signals have little vulnerability to electrical disturbances in the neighborhood. Finally, the flow meter of the invention can be made very small in size, and no temperature or heat dissipation problems are presented.

In the case of the above-mentioned first embodiment, the cross-shaped vibrator can conveniently be connected to a fixed structure in the casing at the mid-point of the cross. This assures that little vibration energy leaks away to the casing of the flow meter. For excitation of the vibrator it is advantageous to use E-shaped cores, on the middle legs of which the windings are located, the middle legs being aligned on opposite sides of the vibrator with mutually facing pole surfaces, while the outer poles of the cores are angularly displaced by an angle corresponding to the angle between the beams of the vibrator cross. The cores, like the middle of the cross, can be fixably mounted in the casing. With this arrangement, the vibrator is particularly easy to excite, and the construction is sturdy and little subject to disturbance. In this construction, it is advantageous to hold the middle of the vibrator cross between the pole surfaces of the middle legs of the core, while an air gap is provided between the pole surfaces of the outer core legs and the vibrating surfaces of the beam strips of the core. Such an arrangement provides a simple mounting of the vibrator, with respect to the housing, and a reliable magnetic contact.

In the above-described embodiment, it is further advantageous, in a first modification thereof, to provide permanent magnets connecting each central core leg tip with the middle of the vibrator cross. Such permanent magnets make it unnecessary to provide magnetic bias with direct current.

In another modified embodiment, it is useful to constitute the electromagnetic core in the form of a cup core with a re-entrant central leg coaxially disposed, on which the exciter winding and a secondary winding are provided, while permanent magnet wafers are set in the rim portion of the core, opposite the arms of the cross-shaped vibrator. A device of this coaxial configuration is easy to manufacture and has the advantage that the coils are in a protected location. For further protection, it is desirable, if the open side of the cup core faces upstream, to provide a more or less hemispherical dome to cover the magnet on the upstream side. Such a dome is advantageously connected to the rim of the cup core and slotted for passage of the beam strips of the cross-shaped vibrator. This provides a particularly good degree of protection for the vibrator device.

The excitation of the flow meter in the various embodiments utilizing E-shaped cores may be produced with a generator operating at audio or supersonic frequency that furnishes two alternating voltages having a relative phase shift of 90°, which respectively energize the excitation windings of the two E-shaped cores. The voltages produced in the secondary windings are then summed and supplied to a phase discriminator to which a reference voltage from the generator is provided. The output signal of the phase discriminator is then a measure for the mass flow of fluid.

Another possibility for excitation of such an electromagnet arrangement is to generate alternating voltages having a relative phase shift of 180° and to superimpose a constant direct current on the alternating currents provided by these alternating voltages and respectively supplied to the exciter coils of the cores. In this case again, the voltages induced in the secondary windings are summed and supplied to a phase discriminator. With the use of permanent magnets set in the magnetic circuit, the superimposition of a direct current becomes unnecessary. Furthermore, in the embodiments using a single coaxial core with magnets set in the rim, a single exciter winding is sufficient to excite the cross-shaped vibrator in a counterstroke mode when each diammetral pair is made up of magnets poled the same way and the pairs are oppositely poled.

For suppression of disturbance, it is desirable to provide a bandpass filter between the summing circuit and the phase discriminator. For zero setting of the flow meter scale (hereinafter referred to as calibration, although this is not a complete calibration operation), it is desirable to interpose a phase shifter between the phase discriminator and the reference voltage output of the oscillator that generates the alternating voltage for the system. Another useful circuit for excitation of the flow meter is to utilize an oscillator or a similar generator for controlling a controllable current source that supplies current to the exciter winding. The induced voltage in a single secondary winding of the coaxial core is, again, supplied to a phase discriminator to supply a suitable output signal for the flow meter.

In the magnetostrictive embodiment of the invention mentioned above, it is practical to provide two bores through the rod structure at nodal points, into which mounting bearing pins or wires can penetrate. This configuration also makes it possible to prevent any appreciable amount of vibratory energy going off to the casing. It is preferred to pass wires of hard spring metal through the bores and to anchor the wires in bearing posts mounted on a support structure, which may conveniently be a cylindrical plate or block. A simple support bearing structure for the magnetostrictive rod structure is thereby provided. If, as above mentioned, the magnetostrictive vibrator is split in the middle into two cores, it is advantageous for excitation to provide a coil on each branch. It is then possible with the same coils to provide, before putting the device in service, a remanent bias magnetization of the core. In service, the alternating currents are supplied to these coils to excite flexure vibrations magnetostrictively. The cylindrical block preferred for mounting the vibrator can be reliably held in position in a flow duct casing by means of spokes. A more or less hemispherical shell can then cover the exposed side of the vibrator, and the side so covered can conveniently be made the upstream side. The vibrator is then protected from damage by any solid particles contained in the flowing medium.

BRIEF DESCRIPTION OF THE DRAWINGS

The invention is further described by way of illustrative example with reference to the annexed drawings, in which:

FIG. 2 is a block diagram of a first embodiment of a circuit for driving the vibrator of FIG. 1;

FIG. 3 is a block diagram of another circuit for driving the vibrator of FIG. 1;

DESCRIPTION OF THE ILLUSTRATED EMBODIMENTS

The flow of mass of a medium can be directly determined by means of resistance bodies. For this purpose, a baffle body is put into vibration parallel to the axis of a tube through which the fluid flows and in which the baffle body is located, the vibrations being produced at constant amplitude, and the supplementary damping occurring as the result of the flow of the medium is observed. Further details regarding the manner of operation of throughput meters utilizing vibrating baffle discs or plates are to be found, for example, in U.S. Pat. No. 4,024,759. The excitation of the vibrating baffle disc still presents difficulties. An electromagnetic excitation of the vibrating baffle disc has the advantage that relatively sturdy and impact resistant construction elements can be used. Furthermore, the measurement signal sources then coming into consideration have small internal resistance, so that the signals are therefore only slightly vulnerable to disturbances. The devices described below are so constructed that only very little vibration energy leaks off to the casing of the measuring instrument.

Figure 1:
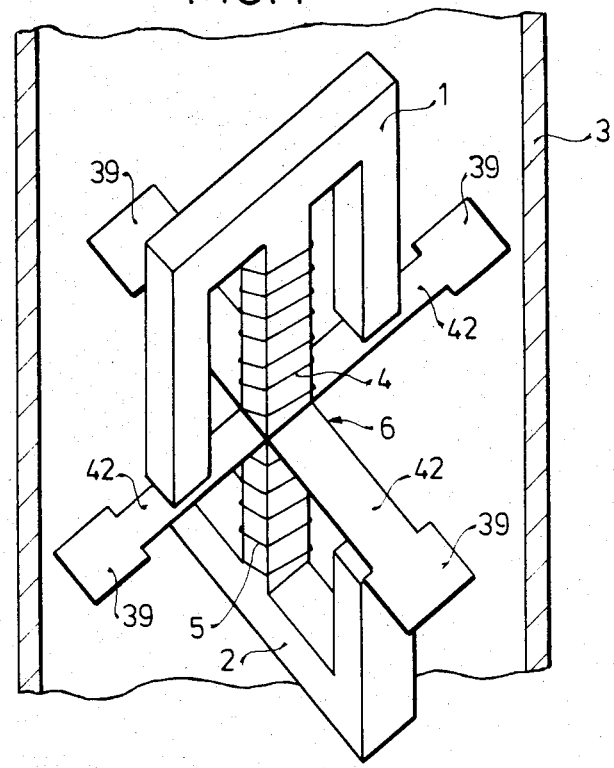
FIG. 1 is a basic diagram, more or less in perspective, with a tubular casing broken away and supporting structures omitted, for a first embodiment of the invention.

In FIG. 1, a cross 6 of flat spring steel of high magnetic permeability serves as the vibrator. It has strip cross beams 42 on the ends of which are baffle discs or plates 39, and the cross strips are so excited that they move in a counter-stroke fashion. In consequence, the midpoint of the cross 6 is a vibration node and can, therefore be fixed firmly to the casing 3 without energy loss. The casing 3 is tubular in shape and serves for guiding the fluid of which the rate of flow is to be measured. Only the internal mechanical losses of the spring material and the surrounding fluid contribute to the damping of the vibrator 6. The baffle discs 39 vibrate in the annular gap between the tubular casing walls of the casing 3 and a cylindrical covering of the central part and of the electromagnetic system. It is to be considered in this connection that a pressure, which is always in the same sense or direction, is exerted by the flowing medium on the baffle discs, which the cross beam strips 42 must withstand without any great amount of bending. In spite of the stiffness necessary for the strip beams 42 for this purpose, small excitation forces are sufficient, because the vibrating cross 6 is driven in resonance.

For excitation of the vibrating cross 6, there are two E-shaped laminated cores 1 and 2 of a highly permeable material that are disposed in axial symmetry with their pole surfaces facing eath other, but shifted with respect to each other by 90°. These cores are affixed in the casing 3 through which the fluid, of which the flow is to be measured, passes. The middle legs of the cores are provided with coils 4 and 5, and the pole surfaces of the central legs confine between them the mid-portion of the cross-shaped vibrator 6, while the pole surfaces of the outer core legs in each case stand at a small spacing from a beam strip of the cross. For excitation, an alternating voltage is applied to the windings of the middle core legs. The resulting currents produce alternating flux and, resulting therefrom, variable pulling forces between the pole surfaces and the beams 42 that vary periodically about a finite mean value.

Since the forces have effect comparable to the square of the exciting current, the pulsation frequency of the forces is twice as great as the frequency of the exciting current.

If now the cores 1 and 2 are excited with a phase difference for one relative to the other which is 90°, the forces in the two cores 1 and 2 operate in counter stroke, i.e., the ends of one of the crossed beam strips are attracted while the ends of the other, being released, spring back in the same direction. On the reverse stroke it is the ends of the last-mentioned beam which are attracted, while the first-mentioned ends spring back. For indication of the mass flow of the fluid, a circuit can be used as shown in FIG. 2. On each of the middle core legs, a supplementary winding must be provided, in which a voltage is induced which is proportional to the time rate of change of the magnetic flux. By superimposition of excitation with the fundamental wave and an air gap variation by the vibrations of the beams 42 in the second harmonic, there is produced in the flux a third harmonic component that also appears in the induced signal, with a phase that depends from the damping of the vibrator. For phase measurement, a reference signal of the third multiple of the exciting voltage frequency is required.

The vibration frequency is, as already mentioned, a resonant frequency of the strips having a baffle plate at their ends, and this is conveniently in the audio or supersonic range.

As shown in FIG. 2, an alternating current source 7 operating at six times the fundamental frequency is supplied simultaneously to two frequency dividers 8 and 9. The first frequency divider 8 divides the frequency of the generator 7 by 3, while the second frequency divider 9 divides the frequency by 2. The output signal of the frequency divider 8 then goes through an inverter 10 to an additional frequency divider 11, with the division ratio 2:1 and also directly to the divider 11a with the same division ratio. In this manner, there are produced two alternating voltage waves of the fundmental frequency, one shifted 90° in phase from the other. These serve for energization of the exciter windings 12 and 13 respectively corresponding to the coils 4 and 5 of FIG. 1. The voltages induced in the secondary windings 14 and 15 that are respectively separate winding parts of the coils 4 and 5, are supplied to a summing circuit 16 and added there, after which the resultant signal goes through a band pass filter 17 the phase discriminator 18. The alternating voltage at the output of the frequency divider 9, which has three times the fundamental frequency, serves as the reference signal for the phase discriminator 18. This reference frequency wave is passed through a phase shifter 19 to the phase discriminator 18. The output signal of the system is available at the output of the phase discriminator 18. The phase shifter 19 is so set that in the quiescent state of the measuring fluid, the output signal is zero. If the vibrator 6 is additionally damped by the flow of the fluid, a phase shift occurs in the third harmonic of the induced voltage, and this appears at the output as a voltage well-suited to represent a measure of the damping and therefore a voltage that can be used for indication of the mass throughput of the fluid.

A second possibility for exciting the vibrating cross 6 in a counter stroke motion consists in supplying a constant supplementary direct current in each of the coils 4 and 5 on which the exciting alternating currents will be superimposed. Such a system is shown in FIG. 3. In this case, each of the cores 1 and 2 receives a pulsating flux without any reversal of sign (i.e., of direction of flux). In consequence, the attraction force now pulsates at the fundamental frequency (instead of at twice that frequency). There must now be a difference of 180° between the phases of the alternating component in the fluxes of the two magnetic circuits, so that the attraction of one core is at a minimum while the attraction of the other is at a maximum. Through the combined effect of excitation and air gap size change, the second harmonic of the base frequency now appears in the flux. Since the beam strips 42 vibrate mechanically in unison, with their drives in phase opposition, this overtone wave is compensated. The combined signal of the secondary coils contains essentially the fundamental wave. Its phase depends on the amount of damping.

As in the previous example, here also a phase discriminator is used to evaluate the effect of damping. FIG. 3 shows the circuit in a block diagram. The output voltage at the fundamental frequency is produced by the generator 20 and proceeds through an inverter 21 through a first controlled current source 22, while also being furnished directly to a second current source 23. The second input of each of the current sources 22 and 23 is connected to the d.c. voltage source 24. The d.c. voltage of the source 24 is higher than the negative peak value of the alternating voltage of the generator 20. The pulsating output currents flow through the exciting windings 12 and 13 of the coils 4 and 5 respectively. They induce secondary voltages that are made available by the windings 14 and 15, and these voltages are added together in the summing circuit 16, so that the sum signal can be supplied through the band pass filter to the phase discriminator 18. The output voltage of the fundamental frequency generator 20 provides the reference signal for the phase discriminator 18 after passing through a phase shifter 19 before application to the phase discriminator. The output signal of the system is, again, provided at the output of the phase discriminator 18. The phase shifter 19 is so set when the measuring fluid is quiescent that the output signal of the phase discriminator 18 is then zero. Then, if the vibrator is additionally damped by flow of the fluid, a phase shift occurs in the fundamental wave of the induced voltage and at the output of the circuit there appears a voltage suitable for representing the amount of damping that is, accordingly, used as an indication of mass throughput of fluid.

In a further modified embodiment of the invention, permanent magnets 25 are provided which produce a constant magnetic bias in each of the magnetic circuits. The flux generated by the windings 12 and 13 is then superimposed on the magnetic bias flux, so that with suitable poling of the magnets, pulsating fluxes acting in counter-stroke without the occurrence of any flux reversals. This embodiment has the advantage that the d.c. voltage source 23 of FIG. 3 can be omitted. The evaluation of the effect of fluid flow can be made in the same manner as in the preceding example.

Figure 4:
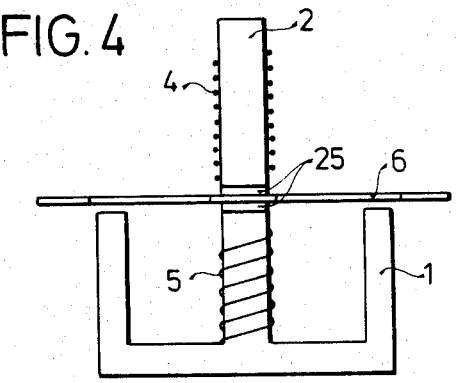
FIG. 4 is a diagrammatic side elevation view of a modification of the kind of vibrator and driving mechanism shown in FIG. 1.

FIG. 4 shows, in section, a flow meter head of the kind shown in FIG. 1. The laminated cores 1 and 2 in E shape, which are offset from each other by 90°, are here recognizable. The coils 4 and 5 on the middle legs of the cores are also evident. In this case, however, magnetic wafers 25 are set between the pole surfaces of the middle legs of the E-shaped cores 1 and 2, and the vibrator 6, in order to provide the magnetic bias above described.

Figure 11:
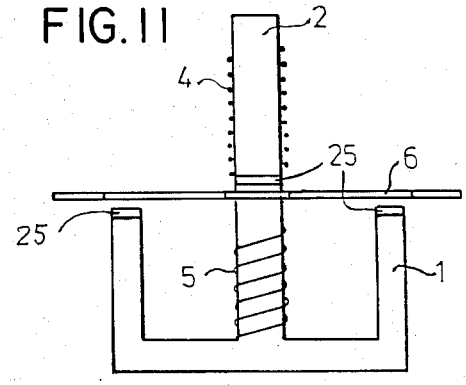
FIG. 11 is a modification of FIG. 4 showing an embodiment similar in behavior to that of FIG. 4.

FIG. 11 shows a modification of FIG. 4 in which the magnets 25 are set between the pole surfaces of the outer legs of the cores 1 and 2 in order to provide magnetic bias.

Figure 5:
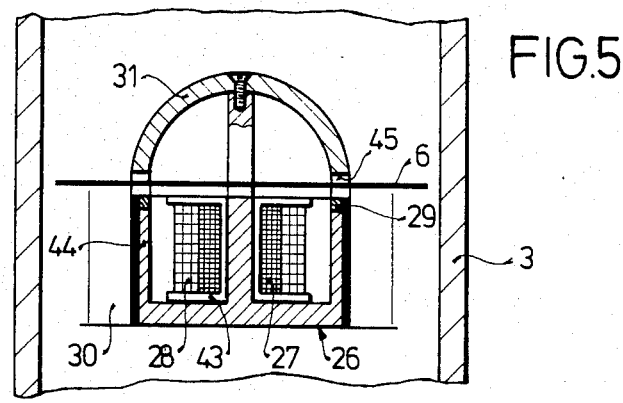
FIG. 5 is a cross-sectional view.
Figure 6:
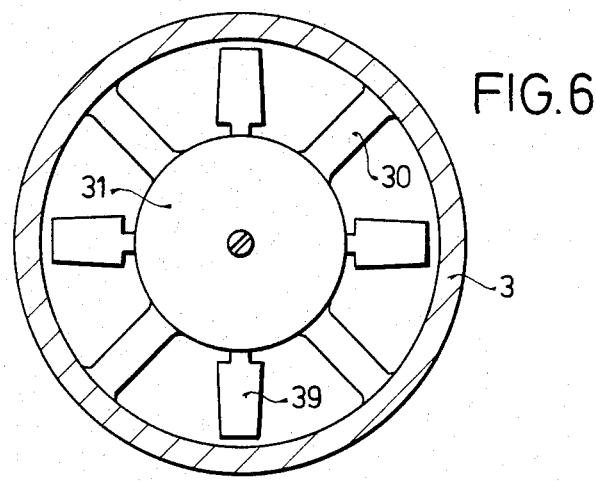
FIG. 6 a top view, partly in section, of another embodiment of a throughput flow meter vibrator according to the invention.

A further embodiment that operates in the same way as the embodiment illustrated in FIG. 4 is shown in FIG. 5. In this configuration of FIG. 5, there are no separate E-shaped cores, but instead there is a coaxial electromagnet with a coaxial iron body 26, which may be described as a re-entrant cup core, the exciter winding 27 and a secondary winding 28 surrounding the re-entrant core leg in the center. The windings are mounted on a spool 43. The cross-shaped vibrator 6 is mounted on the end surface of the re-entrant central pole of the core 26. Opposite the strips of the cross-shaped vibrator 6, magnet wafers 29 are set in the rim portion 44 of the core 26. The electromagnet is held in place centrally in the tubular casing 3 of the flow meter by means of spokes 30 (FIG. 6). For protection against damage, the vibrator is protected on the upstream side by a hemispherical dome 31. In this dome, slots are milled for free passage of the strip cross beams of the vibrator. Among the magnets set opposite the beam strips, both members of a pair at opposite ends of the same strip are magnetized in the same direction, but the polarity of one pair is opposed to the polarity of the other pair.

FIG. 6 shows the device of FIG. 5, as seen from upstream (from the top with reference to FIG. 5). The spokes extending to the casing 3 for holding the vibrator are plainly visible. The dome 31 intended to protect the exciter system from damage is shown in the middle. The baffle members 39 project out of the dome 31 and, of course, are affixed to or integral with the vibrator 6, the rest of which is covered by the dome 31.

Figure 7:
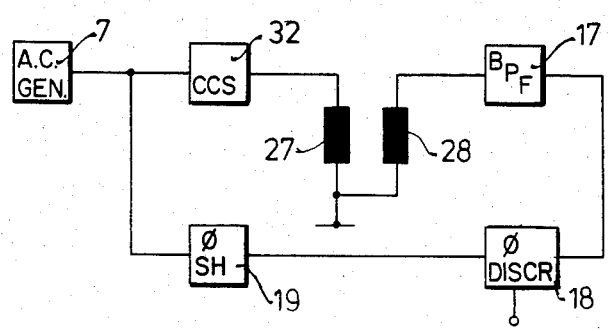
FIG. 7 is a circuit block diagram of a circuit for use with the apparatus of FIGS. 5 and 6.

When an alternating current flows in the exciter winding 27, the beam strips of the vibrator 6 are excited into counter-stroke vibrations. Their reaction back on the flux in the core is, however, unidirectional with reference to the fundamental wave, while the even harmonics are suppressed. The fundamental wave, therefore, predominates in the total flux. The induced voltage has a phase shift with respect to the exciting current, and this phase shift is influenced by the damping of the vibrator. FIG. 7 shows an example of an evaluation circuit. The alternating frequency generator 7, acting through a controlled current source 32, excites the winding 27 of the electromagnet. No d.c. voltage source is necessary because of the permanent magnets 29. The voltage induced in the secondary winding 28 is filtered by the band pass filter 17 and then supplied to the phase discriminator 18. The latter has its reference voltage provided through the phase shifter 19 from the output of the alternating frequency generator 7. At the output of the phase discriminator 18, the measurement signal is again available. Calibration of the circuit is performed as already described.

In a manner analogous to piezoelectric mass throughput meters, it is also possible to excite the vibration by pulses, and in this case, instead of evaluating the damping by the phase shift produced by it, the pulse response of the system can be observed and the width or peak value of the exciting pulse can be so determined that a vibration of some particular amplitude is maintained. In this case the parameters of excitation are setting magnitudes for amplitude control and at the same time a measure of the damping. Further details of this type of operation are obtainable from the previously mentioned U.S. Pat. No. 4,024,759. This method is practical, however, only for systems with magnetic bias, because only such systems inherently deliver signal voltages with free vibration of the flexure vibrator.

Magnetostrictively excited vibrators can also be usefully substituted for the corresponding electromagnetic systems. Magnetostrictive vibrators have the advantage that they tolerate relatively high temperatures and mechanical stresses without damage.

Figure 8:
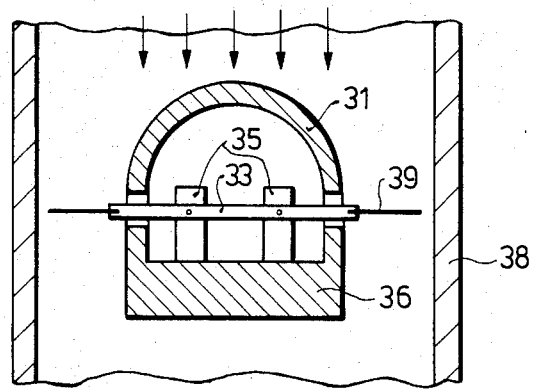
FIG. 8 is a section along the axis of the stream of flow.

As the measuring sensor for flow in such a case, a flexure vibrator is preferably used that is oriented along a diameter in the casing of the flow meter, with its ends equipped with baffle members vibrating in the same sense and in a plane passing through the casing tube axis. Such a device is shown in FIG. 8.

Figure 9:
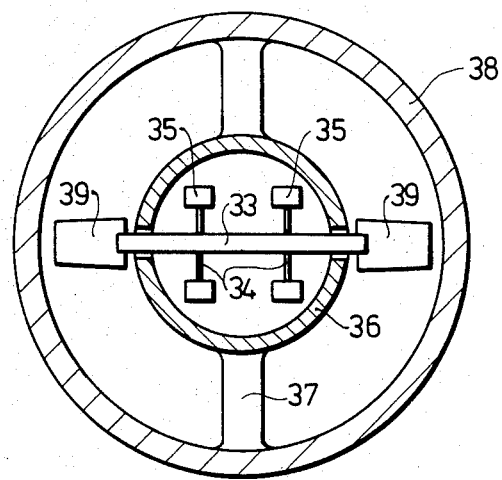
FIG. 9 is a section perpendicular thereto, of another embodiment of flow meter according to the invention, in this case utilizing magnetostriction for vibration.

In a casing 38, a block 36 is held in place by spokes not shown in the drawing. The block 36 carries bearing supports 35 on which the vibrator 33 is mounted. In order to reduce the loss of vibration energy to the casing, the vibrator 33 is, as in the case of the other examples, mounted on node points. The mounting is constituted by having holes provided through the vibrator 33 in its node points for the passage in each case of a spring-hard wire which is taken up tight at both ends in the bearing supports 35. FIG. 9, which shows a view from above with the dome 31 removed, allows further details to be recognized. The magnetostrictive vibrator 33 has the already familiar baffle members 35 at its ends and is mounted on the bearing supports 35 by means of a hard spring wire 34 pulled through the holes in its node points and held at both ends in the supports 35. The supports 35 are connected with the cylindrical block 36 of which the outer rim is shown in FIG. 9. The block 36 is held in the casing 38 by means of the spokes 37.

Figure 10:
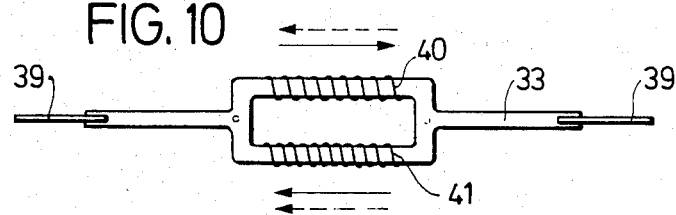
FIG. 10 is a side view of the magnetostrictive vibrator of the device of FIGS. 8 and 9.

In order to excite a flexure vibration about the intended node points by means of magnetostrictive forces, magnetic alternating fields must be produced in the mid-portion of the vibrator, which preferably consists of an alloy having high magnetostriction and also a specific resistance that is as great as possible. The alternating fields produce a periodic prolongation or shortening of the material through which these fields penetrate. For this purpose, the vibrator 33 is advantageously constituted in the manner shown in FIG. 10. In its middle portion, the vibrator 33 splits into two parallel cores individually wound with the windings 40 and 41 respectively. These two core portions form a closed magnetic circuit. This circuit is preliminarily magnetized so as to produce a remanent magnetic field, this being done by means of a sudden current (current shock) through the windings connected in series. The direction of the magnetization vectors are shown in FIG. 10 by arrows. According to the sign of the magnetostriction, there occurs in both core legs simultaneously a shortening or prolongation of equal magnitude, so that no bending of the vibrator is produced. After magnetization, the coils are connected either in series or in parallel, in each case in such a way that henceforth an applied voltage produces parallel running supplementary flux permeations in the legs, in directions shown by the broken line arrows for a momentary value of the voltage. As a result thereof, the magnetizations in the respective core legs change oppositely, so that there are produced opposite changes in length that cause bending of the vibrator. If an alternating voltage is applied to the coils 40 and 41, a flexure vibration takes place. The amplitude of the vibration, in addition to depending on the voltage, also depends upon the ratio of the length of the core legs to their spacing and is accordingly subject to variation by the shape of the branching. At the ends of the vibrator 33, the baffle members 39, which are damped by the flow of fluid, are visible in the drawing. The value of the inductance represented by the two coils is now varied in a detectable manner. For example, this change can be measured by means of a bridge circuit, in order to produce an indication of the mass flow of fluid.

If the coil system composed of the windings 40 and 41 is excited by a pulse, free damped vibrations appear as the pulse response of the vibrator, and the decrement of these damped vibrations provides a measure of the damping. For throughput measurement, this decrement can, for example, be ascertained, or else the parameters of excitation for constantly controlled amplitude of a continuous vibration can be utilized as a measure of the damping.

Although the invention has been described with reference to particular illustrative embodiments, it will be understood that modifications and variations are possible within the inventive concept.

We claim:

1. Throughout meter for flowing media comprising an electromagnetically vibratory body having portions thereof located in a flow duct so as to be damped to an extent dependent on the flow throughput in the duct and a magnet system for exciting the vibrations of said body and for compensating for the damping of said vibrations, said meter further comprising the improvement wherein:

said vibratory body (6) is made of magnetically conducting material in cross shape with beams (42) carrying baffle members (39) at their ends, and said magnet system is arranged to vibrate said beams in flexure so that the crossed beams vibrate with the ends of both beams vibrating in the same sense as the result of excitation alternately attracting in opposite directions first the ends of one beam and then the ends of the other, the one beam returning by spring action while the other is attracted.

2. Throughput flow meter as defined in claim 1 in which a tubular casing is provided for guiding a flowing medium past said baffle members of said vibratory body, and in which said vibratory body is disposed centrally in and transversely of said tubular casing and is connected at the midpoint of its cross shape to a support fixed with respect to said casing.

3. Throughput flow meter as defined in claim 2 in which said magnet system comprises two E-shaped cores (1,2) arranged with the pole surfaces at the ends of their respective middle legs facing each other on opposite sides of said vibrating body and having their outer poles arrayed with respect to each other at the same angle at which said beams of said vibratory body cross each other, said middle legs of said cores each carrying coils (4,5) and said coils being held in fixed relation to said casing.

4. Throughput flow meter as defined in claim 3 in which the middle portion of said vibratory body is held between said pole surfaces of said middle legs of said cores (1,2) and in which the pole surfaces on the outer legs of said cores are separated by an air gap from the adjacent beam portions of said vibratory body.

5. Throughput flow meter as defined in claim 4, in which permanent magnets are set in the ends of said middle legs of said cores for providing a magnetic bias flux.

6. Throughput flow meter as defined in claim 4, in which permanent magnets are set in the ends of the outer poles of said cores for providing a magnetic bias flux.

7. Thoughput flow meter as defined in claim 3 in which a driving and evaluation circut is provided for said magnet system and said vibratary body comprising:

means for generating two alternating voltages of the same frequency differing in phase by 90 and for applying said two alternating voltages respectively to excitation windings (12,13) of said respective coils (4,5);

secondary windings (14,15) provided respectively in said coils (4,5) and means for summing the outputs of said secondary windings, and a phase discriminator circuit (18) for comparing the phase of the output of said summing circuit with a wave derived from said means for generating said alternating voltages and for producing therefrom a measurement signal.

8. Throughput flow meter as defined in claim 3 in which there is provided an excitation and evaluation circuit comprising exciter windings (12,13) included in said coils (4,5) on said middle core legs;

secondary windings (14,15) included in said coils (4,5) on said middle core legs;

means for generating alternating electric voltages of the same frequency and differing from each other by 180 in phase;

means for superimposing a constant d.c. current on waves produced respectively by said alternating electric voltages and supplying the resultant waves and currents respectively to said exciter windings;

means for summing the voltages induced in said secondary windings (14,15) and a phase discriminator circuit for comparing the phase of the output of said summing means to a wave derived from said means for providing said alternating voltages and for thereby producing a measurement signal.

9. Throughput flow meter as defined in claim 7 or claim 8 in which a bandpass filter (17) is interposed between said summing means (16) and said phase discriminator circuit (18).

10. Throughput flow meter as defined in claim 1 in which said magnet system includes an electromagnet having a coaxially reentrant cup core (26) on the reentrant portion of which are provided an exciter winding (27) and a secondary winding (28) and into the rim (44) of which permanent magnets (29) are set opposite the respective portions of said beams of said vibratory body passing adjacent thereto across an airgap therefrom.

11. Throughput flow meter as defined in claim 10 in which a protective body shaped convexly in a surface of revolution on the upstream side thereof is provided upstream of said electromagnet.

12. Throughput flow meter as defined in claim 11 in which said protective body (31) is connected to said rim portion (44) of said electromagnet and is provided with slots (45) for passage of said beams (42) of said vibratory body so that said baffle members may be exposed to fluid flow.

13. Throughput flow meter as defined in claim 10 in which said electromagnet is connected for excitation and evaluation purposes in a circuit comprising: alternating voltage wave generating means (7) connected to a controlled current source (32) for providing an alternating current in said exciter winding (27);

a phase discriminator circuit (18) for comparing the phase of the output voltage of said secondary winding (28) with the phase of a wave derived from said alternating voltage wave generating means and producing a measurement signal.

14. Throughput flow meter as defined in claim 13 in which a bandpass filter (17) is interposed between said secondary winding (28) and phase discriminator circuit (18).

15. Throughput flow meter as defined in claim 7, 8, 13 or 14 in which for calibration purposes a phase shifter (19) is interposed in a reference voltage supply to said phase discriminator circuit (18).

* * * * *